United States Patent [19]

Mattson

[11] Patent Number: 5,439,974
[45] Date of Patent: * Aug. 8, 1995

[54] PROPYLENE-BASED EXTRUDABLE ADHESIVE BLENDS

[75] Inventor: Diana C. Mattson, Loveland, Ohio

[73] Assignee: Quantum Chemical Corporation, Cincinnati, Ohio

[ * ] Notice: The portion of the term of this patent subsequent to Nov. 22, 2011 has been disclaimed.

[21] Appl. No.: 961,131

[22] Filed: Oct. 14, 1992

Related U.S. Application Data

[63] Continuation-in-part of Ser. No. 800,443, Nov. 27, 1991, abandoned, and a continuation-in-part of Ser. No. 954,225, Oct. 7, 1992, Pat. No. 5,367,022, which is a continuation-in-part of Ser. No. 800,443, Nov. 27, 1991, abandoned.

[51] Int. Cl.⁶ ............................................. C08L 51/06
[52] U.S. Cl. ............................................... 525/74; 525/75; 525/78; 525/285; 525/289; 525/301; 525/193
[58] Field of Search ............ 525/74, 78, 71, 207, 525/221, 240, 193, 75

[56] References Cited

U.S. PATENT DOCUMENTS

| | | | |
|---|---|---|---|
| 3,868,433 | 2/1975 | Bartz et al. | 525/78 |
| 3,882,194 | 5/1975 | Krebaum et al. | 525/285 |
| 4,078,017 | 3/1978 | Nagatoshi et al. | 525/265 |
| 4,087,587 | 5/1978 | Shida et al. | 428/500 |
| 4,198,327 | 4/1980 | Matsumoto et al. | 525/73 |
| 4,375,531 | 3/1983 | Ross | 525/93 |
| 4,506,056 | 3/1985 | Gaylord | 524/445 |
| 4,510,286 | 4/1985 | Liu | 525/74 |
| 4,550,130 | 10/1985 | Kishida et al. | 523/436 |
| 4,562,230 | 12/1985 | Fukui et al. | 525/78 |
| 4,727,120 | 2/1988 | Nogues | 525/168 |
| 4,764,546 | 8/1988 | Mitsuno et al. | 525/74 |
| 4,774,144 | 9/1988 | Jachec et al. | 428/461 |
| 4,842,947 | 6/1989 | Jachec et al. | 428/461 |
| 4,942,096 | 7/1990 | Abe et al. | 525/74 |
| 4,966,944 | 10/1990 | Kiang | 525/240 |
| 4,990,554 | 2/1991 | Nomura et al. | 525/74 |
| 5,001,197 | 3/1991 | Hendewerk | 525/285 |
| 5,032,459 | 7/1991 | Toyoshima et al. | 428/424.8 |
| 5,055,526 | 10/1991 | Sato et al. | 525/74 |
| 5,066,542 | 11/1991 | Tabor et al. | 428/461 |
| 5,079,052 | 1/1992 | Heyes et al. | 428/35.3 |
| 5,137,975 | 8/1992 | Kelusky | 525/263 |
| 5,202,192 | 4/1993 | Hope et al. | 525/74 |
| 5,367,022 | 11/1994 | Kiang et al. | 525/74 |

FOREIGN PATENT DOCUMENTS 52-123473 10/1977 Japan.
1-13735 3/1989 Japan.

*Primary Examiner*—James J. Seidleck
*Assistant Examiner*—M. L. Warzel
*Attorney, Agent, or Firm*—Gerald A. Baracka; William A. Heidrich

[57] ABSTRACT

Adhesive blends especially suitable for adhesion to one or more polypropylene substrates consisting essentially of a mixture of a modified impact copolymer and a graft reaction product of a propylene polymer and a carboxylic acid or derivative thereof are disclosed. Composite structures incorporating such blends are also disclosed.

16 Claims, 1 Drawing Sheet

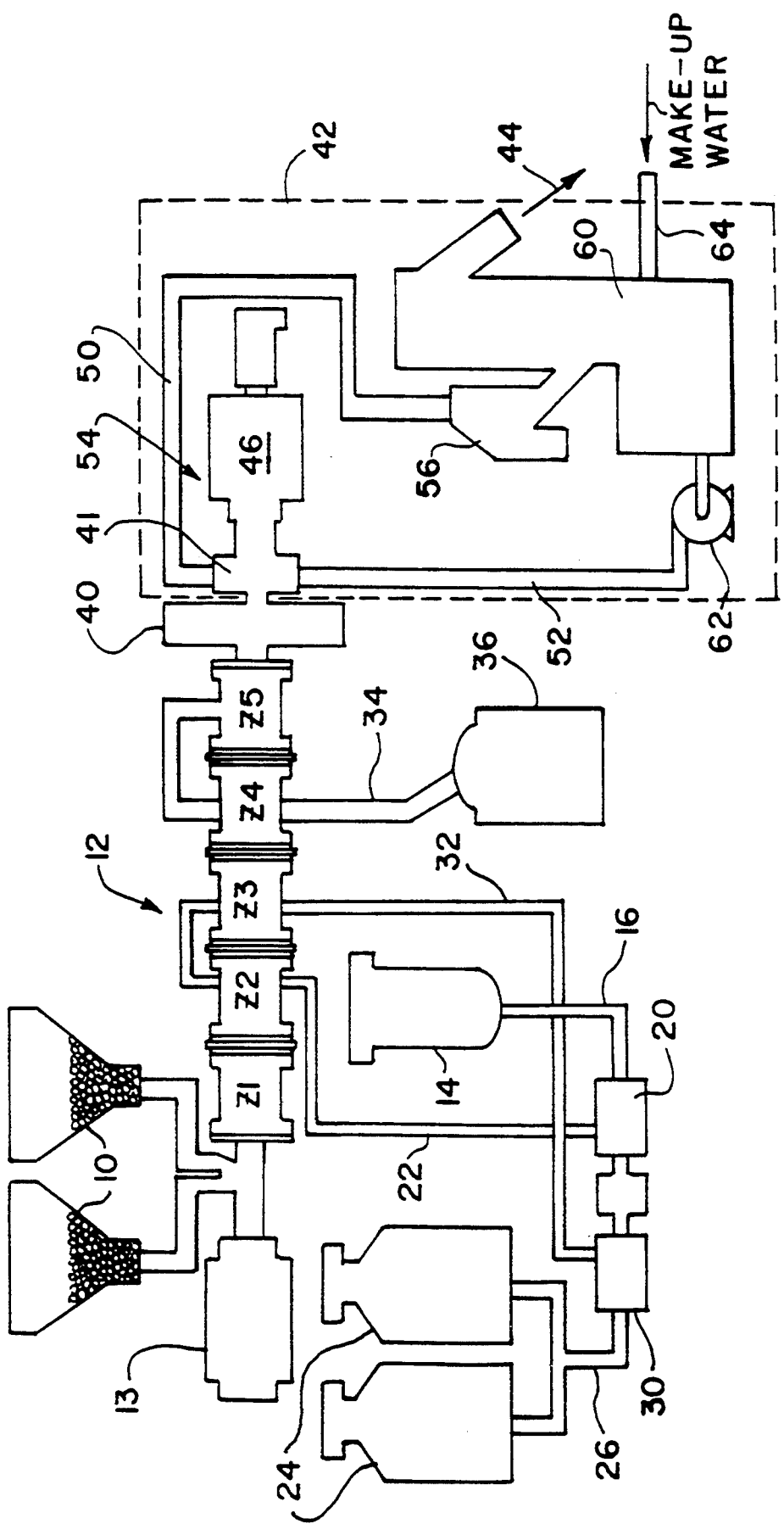

PROPYLENE-BASED EXTRUDABLE ADHESIVE BLENDS

CROSS-REFERENCE TO RELATED APPLICATIONS

This is a continuation-in-part of, commonly assigned application Ser. No. 07/800,443 filed Nov. 27, 1991, now abandoned, and of, commonly assigned application Ser. No. 07/954,225 filed Oct. 7, 1992, now U.S. Pat. No. 5,367,022, issued Nov. 11, 1994, which in turn is a continuation-in-part of application Ser. No. 07/800,443 filed Nov. 27, 1991, now abandoned, the entire disclosures of which are incorporated by reference herein.

BACKGROUND OF THE INVENTION

1. Field of the Invention

The invention relates generally to adhesive blends and composite structures and, more particularly, the invention relates to extrudable adhesive blends consisting essentially of a modified impact copolymer and a graft reaction product of a propylene polymer and a carboxylic acid or derivative thereof and composite structures incorporating such adhesive blends.

2. Description of Related Technology

Polyolefin blends that include polypropylene-based graft copolymers are useful as adhesives for adhesion to one or more .polypropylene substrates. Typically, in the past, such adhesive blends included a graft copolymer such as one having a polypropylene homopolymer backbone grafted with an acid anhydride such as maleic anhydride blended with a propylene homopolymer or an ethylene/propylene copolymer and mechanically blended to a third component for improving adhesion performance. The third component was often a hydrocarbon elastomer or rubber such as EPDM rubber or EPR rubber.

Although the mechanical addition of an elastomer to a blend may improve its adhesion, such an addition is not always satisfactory because the elastomer typically lowers the softening point of the composition and affects the stiffness and moisture barrier characteristics thereof. Therefore, the addition of an elastomer is undesirable when high temperature stability is required, for example in composite structure applications where the adhesive is bonded to an ethylene vinyl alcohol copolymer substrate. Furthermore, the addition of an elastomer to an adhesive blend adds to the cost of the blend and may cause material handling problems. Also, the presence of elastomers in such blends may result in undesirably high contents of extractable materials which may render the blends unsuitable for use in food packaging and other applications.

Other, substantially elastomer-free adhesive blends are available. However, these blends typically contain a third component other than an elastomer. For example, one prior adhesive blend suitable for use in food packaging that provides adhesion between a polypropylene substrate and a polar or other gas barrier material includes a propylene/ethylene copolymer, a graft copolymer, and a high molecular weight low density polyethylene (HMW LDPE). Although a blend containing HMW LDPE shows an improvement over elastomer-addition blends with respect to food packaging, the addition of any type of third component adds to the expense of an adhesive blend.

SUMMARY OF THE INVENTION

It is an object of the invention to overcome one or more of the problems described above.

According to the invention, an adhesive blend especially suitable for adhering to propylene polymers and polar substrates is provided. The invention also comprehends composite structures comprising layers of polyolefin or polar substrates adhered together by the adhesive blend.

More particularly, the adhesive blend consists essentially of a mixture of a modified impact copolymer and a grafted polymeric product comprising a polymeric composition .containing a propylene polymer and a grafted ethylenically unsaturated carboxylic acid or derivative grafting monomer. Excellent adhesion is provided without the necessity of a third, adhesion-enhancing component.

The invention also comprehends composite structures incorporating the extrudable adhesive blend.

Other objects and advantages of the invention will be apparent to those skilled in the art from the following detailed description taken in conjunction with the figure and the appended claims.

BRIEF DESCRIPTION OF THE FIGURE

The sole FIGURE is a schematic process flow diagram depicting a process and system for preparing a preferred grafted polymeric product component of the adhesive blend of the invention.

DETAILED DESCRIPTION OF THE INVENTION

The invention provides an adhesive blend consisting essentially of (and optionally consisting of) about 97 to about 65 wt. % (highly preferably about 97 to about 90 wt. %) of a modified impact copolymer and preferably about 3 to about 30 wt. % (highly preferably about 4 to about 10 wt. %) of a grafted polymeric product comprising a polymeric composition containing a propylene polymer and a grafted ethylenically unsaturated carboxylic acid or derivative grafting monomer. The grafted polymeric product preferably has a grafting monomer content of about 0.1 to about 6 wt. % (highly preferably about 2 to about 3 wt. %) with the concentration of grafted monomer in the adhesive blend preferably being in the range of about 0.003 to about 1.5 wt. %.

The adhesive blend of the invention provides excellent adhesion between polypropylene substrates and polar materials without the necessity of mechanically adding a third, adhesion-enhancing component. Although third components which do not materially affect the nature of the composition could be added to the adhesive blend, the two-component blend is economically advantageous and particularly well suited for coextrusion applications. The two-component blend performs well in coextrusion blowmolding, sheet coextrusion, solid phase pressure forming and retorting, blown and cast film and may therefore be preferred over more expensive three-component blends.

Therefore, the inventive adhesive blend consists essentially of a mixture of a modified impact copolymer and a grafted polymeric product comprising a polymeric composition containing a propylene polymer (particularly preferably a thermoplastic ethylene-propylene copolymer) and a grafted ethylenically unsaturated carboxylic acid or derivative grafting monomer. The phrase "consists essentially of" or "consisting essentially of" as used herein excludes additional unspecified ingredients which would affect the basic and novel characteristics of the adhesive blend. It does not exclude the usual additives to adhesive blends, such as antioxidants or other stabilizers.

The Modified Impact Copolymer

The modified impact copolymer component of the adhesive blend comprises a blend of between about 95 wt. % and about 70 wt. % of (A) an impact copolymer selected from the group consisting of (a) reactor-made intimate mixtures of propylene homopolymers and statistically (e.g. randomly) oriented copolymers of propylene and ethylene, and (b) blends of propylene homopolymers and statistically oriented copolymers of propylene and ethylene, and between about 5 wt. % and about 30 wt. % of (B) an ethylene polymer selected from the group consisting of ethylene homopolymers, low density polyethylene (LDPE), ethylene-acid copolymers (e.g. ethylene-acrylic acid copolymer), ethylene-vinyl acetate copolymers, ethylene-acrylate copolymers such as ethylene-ethyl acrylate copolymer, high density polyethylene (HDPE), linear low density polyethylene (LLDPE), so-called very low density polyethylene (VLDPE), so-called ultra low density polyethylene (ULDPE), and blends thereof.

The modified impact copolymer preferably has a melt flow rate (MFR, at 230° C.) of about 1 to about 200 g/10 min. as measured by ASTMD-1238, Condition L, at 230° C., 2160 g, and a 0.0825 in. capillary. A preferred MFR of the modified impact copolymer is about 1 to about 50 g/10 min. and an MFR of about 1 to about 10 g/10 min. is particularly preferred. For blown film, blow molding and rigid sheet forming applications, such as adhesive blends for bonding polypropylene to ethylene vinyl alcohol (EVOH) copolymer or polypropylene and nylon, the preferred MFR of the modified impact copolymer is about 1 to about 5 g/10 min. For cast film and extrusion coating applications that may also include adhesive blends for bonding polypropylene to EVOH copolymer or for bonding polypropylene to aluminum foil, the preferred MFR of the modified impact copolymer is about 5 to about 16 g/10 min.

In order to obtain a modified impact copolymer having an MFR in the preferred range stated in the previous paragraph, the blend of components (A) and (B) may be visbroken after blending, if needed. Impact visbroken polymeric blends and means for preparing the same are described in detail in Ross U.S. Pat. No. 4,375,531 (Mar. 1, 1983), the disclosure of which is incorporated herein by reference.

A preferred modified impact copolymer of the adhesive blend of the invention has a total ethylene content of about 15 to about 30 wt. % and is made by blending a mixture of about 5 to about 15 wt. % HDPE and about 95 to about 85 wt. % of a reactor-made impact copolymer containing about 6 to about 16 wt. % ethylene. Petrothene ® PP-8755-HK resin from Quantum Chemical Corporation is a preferred modified impact copolymer having a total ethylene content of about 15 to about 30 wt. %.

Component (A): The Impact Copolymer

Preferred impact ethylene-propylene copolymers useful in the modified impact copolymer of the invention are reactor-made intimate mixtures of propylene homopolymers and statistically-oriented copolymers of propylene and ethylene and comprise about 5 to about 30 wt. %, highly preferably about 6 to about 16 wt. % ethylene. Such mixtures are typically made by a multi-stage polymerization process wherein, in a first, stirred reaction vessel, gaseous propylene is contacted with a polymerization catalyst, preferably of the titanium-ester coordination complex type, and an aluminum alkyl to produce a propylene homopolymer. In a second stage, propylene and ethylene are copolymerized in intimate admixture with the polymer formed in the first stage.

Most preferably, the impact copolymer component (A) comprises about 11 to about 15 wt. % (e.g. about 11.5 to about 12.7 wt. %) ethylene and has an MFR in the range of about 0.4 to about 1.5 g/10 min (e.g. about 0.8 to about 1.3 g/10 min).

Impact copolymers generally are defined as having Gardner Impact values in the range of 125–240 in-lbs., as measured at −18° C. according to ASTMD-3029-84, test method "G."

Impact copolymers having ethylene contents greater than 11 or 12 wt. % are sometimes referred to in the art as "thermoplastic olefins" ("TPOs") or "thermoplastic olefinic elastomers" ("TPOEs"), and are useful in the invention not only as polymeric compositions to be grafted, but as polyolefin blending resins in adhesive blends.

TPOs and TPOEs are sometimes additionally characterized by reference to their flex modulus and possibly other physical properties, but the correlation between ethylene content and these physical properties may vary with the specific technology used to produce these materials.

Component B: The Ethylene Polymer

The ethylene polymer of component (b) is selected from the group consisting of ethylene homopolymers, low density polyethylene (LDPE), ethylene-acid copolymers (e.g. ethylene-acrylic acid copolymer), ethylene-vinyl acetate copolymers, ethylene-acrylate copolymers such as ethylene-ethyl acrylate copolymer, high density polyethylene (HDPE), linear low density polyethylene (LLDPE), so-called very low density polyethylene (VLDPE), so-called ultra low density polyethylene (ULDPE), and blends thereof.

A particularly preferred component (B) of the modified impact copolymer is an HDPE which has a melt index (MI, as measured by ASTMD-1238, Condition E, i.e. at 190° C., 2160 g, and a 0.0825 in. capillary) of about 2 to about 50 g/10 min., preferably about 30 g/10 min. A preferred modified impact copolymer contains about 5 to about 30 wt. % of HDPE.

With respect to the utilization of LLDPE and VLDPE as component (B) of the modified impact copolymer of the invention, LLDPE is defined for the purposes of this disclosure as having a density of up to about 0.940 g/cc, typically in the range of 0.910–0.939 g/cc, VLDPE is defined as having a density in the range of 0.900–0.910 g/cc, and ULDPE is defined as having a density of 0.880–0.899 g/cc.

The Grafted Polymeric Product

The grafted polymeric component of the blend comprises a polymeric composition containing a propylene polymer, and a grafted ethylenically unsaturated carboxylic acid or derivative grafting monomer wherein the grafting monomer comprises at least about 1 wt. % of the grafted polymeric product, and wherein the grafted product has a melt flow rate greater than that of the ungrafted polymeric composition of about 700 g/10 min or less, and preferably about 500 g/10 min, or less, as measured according to ASTMD-1238, Condition L (230° C., 2160 g, 0.0825 in. capillary).

The Polymeric Composition

The ungrafted polymeric composition, which contains a propylene polymer, comprises predominantly, (i.e. greater than 50 wt. %, typically at least about 75 wt. %) propylene units, is preferably selected from statistical ethylene-propylene copolymers, impact ethylene-propylene copolymers and propylene homopolymers, and typically has an initial (i.e., ungrafted) MFR of about 12 g/10 min. or less, preferably in the range of about 0.01 to about 12 g/10 min., and highly preferably at least about 0.1 g/10 min.

Statistical ethylene-propylene copolymers preferred for use as an ungrafted polymeric composition of the invention comprise about 1 to about 10 wt. %, highly preferably about 1 to about 6 wt. %, and most preferably about 2 wt. % ethylene and the balance propylene units. When grafted with about 1 to about 6 wt. %, preferably about 1.5 to about 4 wt. %, and highly preferably up to about 3 wt. % of the grafting monomer, using a statistical copolymer having an ungrafted MFR of about 1 to about 3 g/10 min., the MFR of the resulting grafted product is about 700 g/10 min. or less, typically in the range of about 300 to about 500 g/10 min., and preferably does not exceed about 600 times, and highly preferably does not exceed 400 times the MFR of the ungrafted polymeric composition.

The impact copolymers useful as the ungrafted polymeric composition of the invention are the same as those defined above with respect to the modified impact component (A).

When an impact copolymer having an initial MFR of about 0.4 to about 1.5 g/10 min. is grafted with about 1 to about 6 wt. % (e.g. about 1.5 to about 4 wt. %) grafting monomer according to the invention, the MFR of the resulting grafted product is about 700 g/10 min. or less, typically in the range of about 200 to about 450 g/10 min., and the grafted product MFR preferably does not exceed about 600 times, and highly preferably does not exceed 400 times the MFR of the ungrafted impact copolymer.

Preferred propylene homopolymers useful as the ungrafted polymeric composition of the invention typically have an ungrafted MFR of about 0.1 to about 5.0 g/10 min. with the resulting grafted product having an MFR of about 800 to about 2000 g/10 min. and a grafted monomer content of about 0.5 to about 3 wt. %.

A preferred ethylene-propylene copolymer-containing polymeric composition to be grafted comprises predominantly (i.e. greater than 50 wt. %) propylene units. However, especially in the case of impact copolymers, substantial amounts of substantially ungraftable or difficultly graftable components (such as propylene homopolymer, which grafts only at insignificant levels without chain scission) may be present, and the readily graftable ethylene-propylene copolymer component may be present in a disperse phase, for example dispersed in a continuous phase of propylene homopolymer. In any case, while the polymeric composition to be grafted is predominantly propylene, taken as a whole, the disperse ethylene-propylene copolymer phase need not be predominantly propylene, and may in fact be predominantly ethylene, as it may contain ethylene homopolymer, EPR, and block ethylene-propylene copolymer in addition to statistical ethylene-propylene copolymer and propylene homopolymer. Substantially all grafting occurs in the ethylene-containing disperse phase.

While the preferred polymeric composition on which grafting takes place is predominantly propylene, the ethylene-containing polymer molecules on which grafting occurs need not be predominantly propylene, nor need the ethylene-containing disperse phase be predominantly propylene.

The Grafting Monomer

The grafting monomer is at least one polymerizable, ethylenically unsaturated carboxylic acid or acid derivative, such as an acid anhydride, ester, salt, amide, imide, or the like. Such monomers include but are not necessary limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthhalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride (XMNA).

Maleic anhydride is a preferred grafting monomer.

As used herein, the term "grafting" denotes covalent bonding of the grafting monomer to a polymer chain of the polymeric composition.

In a preferred grafted product of a statistical ethylene-propylene copolymer-containing polymeric composition and a maleic anhydride grafting monomer, the grafted maleic anhydride concentration is generally in the range of about 1 to about 6 wt. %, preferably at least about 1.5 wt. % and highly preferably about 2 wt. % and preferably is such that the MFR of the grafted product is about 700 g/10 min. or less, more preferably in the range of about 300 to about 500 g/10 min. Highly preferably, the statistical copolymer comprises about 2 wt. % ethylene and has an ungrafted MFR of about 2 g/10 min. Petrothene® PP-7200-MF polypropylene from Quantum Chemical Corporation is a suitable statistical ethylene-propylene copolymer for use as the ungrafted polymeric composition.

Where the ungrafted composition is an impact copolymer, it preferably has an ethylene content of about 12 to about 15 wt. % and an ungrafted MFR in the range of about 0.8 to about 1.5 g/10 min., and the preferred maleic anhydride grafting monomer is incorporated in the grafted product at a concentration such that the MFR of the grafted product is in the range of about 200 to about 400 g/10 min. The grafted maleic anhydride concentration is preferably about 1.5 wt. % to about 4 wt. %, and highly preferably about 2 wt. % to about 2.5 wt. %.

Where the ungrafted composition is a propylene homopolymer, the grafted maleic anhydride concentration is preferably about 0.5 wt. % to about 3 wt. %.

Process of Preparing Grafted Polymeric Products

The grafted polymeric products may be prepared in solution, in a fluidized bed reactor, or by melt grafting as desired.

A particularly preferred grafted product may be conveniently prepared by melt blending the ungrafted polymeric composition, in the substantial absence of a solvent, with a free radical generating catalyst, such as a peroxide catalyst, in the presence of the grafting monomer in a shear-imparting reactor, such as an extruder reactor. Twin screw extruder reactors such as those marketed by Werner-Pfleiderer under the designations ZSK-53 and ZSK-83 are especially preferred.

Preferably, catalyst is introduced to the molten polymeric composition at ambient temperature and the grafting monomer is introduced to the resulting mixture. The grafting monomer may be introduced at a slightly elevated temperature (e.g. 50° C.). The grafting reaction is carried at a temperature selected to minimize or avoid rapid vaporization and consequent losses of the catalyst and monomer. The monomer is typically introduced to the reactor at a rate of about 0.01 to about 10 wt. % of the total of the polymeric composition and monomer, and preferably at about 1 to about 5 wt. % based on the total reaction mixture weight.

A temperature profile where the temperature of the polymer melt increases gradually through the length of the reactor up to a maximum in the grafting reaction zone of the reactor, and then decreases toward the reactor output is preferred. Temperature attenuation is desirable for product pelletizing purposes. An outlet molten polymer temperature of about 200°±10° C. is optimum for operating an underwater pelletizer for a ZSK-53 extruder.

In the case of the preferred di-tert-butyl peroxide (DTBP) catalyst, the maximum temperature should be maintained at or below about 220° C. (about 428° F.) to prevent vaporization losses or premature decomposition of the catalyst. In contrast, so-called "thermal" grafting processes of the prior art which do not use catalysts may use temperatures up to about 380° C. (about 716° F.). The maximum useful temperature in the invention varies with the selection of catalyst.

Since substantial amounts of solvent are to be avoided, the catalyst and monomer are preferably added in neat form to the reactor.

Specific examples of useful catalysts include:
1,1-bis(tert-butylperoxy)cyclohexane,
n-butyl-4,4-bis(tert-butylperoxyvalerate),
1,1-bis(tert-butylperoxy)-3,3,5-trimethylcyclohexane,
2,2-bis(tert-butylperoxy)butane,
dicumylperoxide,
tert-butylcumylperoxide,
a,a'-bis(tert-butylperoxyisopropyl)benzene,
di-tert-butylperoxide (DTBP),
2,5-dimethyl-2,5-di(tert-butylperoxy)hexane,
and the like.

A preferred process for preparing the particularly preferred grafted polymeric product of the blend according to the invention is illustrated by the process flow diagram of the FIGURE.

Referring to the FIGURE, an ungrafted polymeric composition in bulk, pelletized, or granular form is fed from feed bins 10, illustratively at a rate of about 50 lb/hr, into a first zone Z1 of a preheated twin-screw extruder/reactor, generally designated 12, driven by a motor 13, where the feed is heated gradually through a series of five heated zones designated Z1–Z5 to a molten state, while a free radical generating catalyst (e.g., di-tert-butyl peroxide) is separately fed, illustratively at a rate of about 0.5 lb/hr, from a feed tank 14 via a line 16 through a feed pump 20 and a line 22 into the zone Z2 of the extruder/reactor 12 to mix with the molten polymer. Separately, the grafting monomer, illustratively maleic anhydride, is fed, illustratively at a rate of about 2 lb/hr, from supply tanks 24 via a line 26 through a feed pump 30 and a line 32 to the zone Z2 of the extruder/reactor 12. The monomer and catalyst are fed separately to the same reaction zone.

The zones Z1–Z5 of the extruder 12 are maintained at temperatures ranging from about 165° C. to about 220° C. to effect melting of the polymeric composition and to control the rate of catalyst decomposition during the grafting reaction. The residence time of the reaction mixture in zones Z1–Z5 is generally about 3 to about 5 minutes, after steady-state conditions are established.

As the reaction proceeds in the reaction zones Z3 and Z4, any unreacted catalyst and monomer vapors are removed from the zone Z5 through a vent line 34. The collected vapors are condensed and trapped in a chilled vacuum tank 36.

The reactor 12 discharges molten grafted product through an optional Beringer screen changer 40 through a die plate 41 of an underwater pelletizer, generally designated 42, from which pelletized product is discharged at 44. In addition to the die plate 41, the pelletizer 42 comprises an internal knife blade (not shown) facing the die plate 41 and driven by a motor 46, water circulation conduits 50 and 52 communicating with a die plate/motor housing 54, a solid/liquid separator 56, and a spin dryer 60, as shown in the FIGURE. A pump 62 is disposed between the conduit 52 and the dryer 60 to circulate water through the conduit 52, over the die plate 41, through the conduit 50 and the separator 56 to return to the pump 62. Make-up water is provided to the system through an inlet conduit 64, as needed.

Extruded grafted polymeric product from the die plate 41 is chopped by the knife blade, and a mixture of the resulting product pellets and water is carried by the conduit 50 to the separator 56, which separates the bulk of the water from the mixture, for recirculation to the die plate 41 through the conduit 52 by means of the pump 62. Product polymer is further separated from residual water in the dryer 60 and discharged at 44.

The Adhesive Blend

The adhesive blend of the invention may be prepared by melt compounding the modified impact copolymer and the grafted polymeric product with the usual additives (e.g. antioxidants, etc.) and pelletizing the blended material. If the modified impact copolymer is a visbroken blend, the components may be blended together in the downstream section of the same extruder used for visbreaking.

As used herein with respect to blend components and composite structure substrates, the terms "polypropylene" and "propylene polymer" may be used interchangeably, and denote propylene homopolymers and copolymers, whether statistical, block, impact or modified impact copolymers, unless otherwise indicated.

The inventive adhesive blends are useful in bonding to propylene polymers, polyesters, gas barrier materials and other polar substrates such as metals, nylon, ethylene vinyl alcohol (EVOH) copolymers, and the like. The adhesive blends are especially suitable for bonding polypropylene substrates to EVOH. Such EVOH substrates are generally formed from 29 to 48 mole % ethylene grades.

Five- and six-layer structures are suitable for use in forming bottles. One suitable six-layer bottle structure is PP/adhesive/EVOH/adhesive/regrind/PP where the regrind layer comprises ground manufacturing trim of the composite structure, and thus includes all the constituents of the structure. A five-layer structure omits the regrind layer from the structure described above, and is useful in sheet and thermoformed container manufacture.

A seven-layer structure useful in sheet and thermoforming container manufacture is PP/regrind/adhesive/EVOH/adhesive/regrind/PP.

In any of the foregoing structures, polyethylene terephthalate or equivalent materials can be substituted for one or both polypropylene layers.

The invention also comprehends a method of making composite structures wherein the inventive adhesive blend is adhered to one or more solid substrates such as those identified herein. Suitable methods include, but are not limited to coextrusion (e.g. blown film coextrusion), cast film coextrusion, coextrusion coating, sheet coextrusion and coextrusion blow molding. The latter is a preferred method of forming bottles, for example.

Other useful composite structure forming methods include injection blow molding, stretch blow molding, melt thermoforming, solid phase pressure forming (SPPF), coated film and blown filming.

EXAMPLES

The invention is further described and illustrated by the following detailed examples which are not intended to be limiting.

Example 1

Five adhesive blends were made (Samples A-E) and their adhesion values were measured using a T-peel test according to ASTMD1876 on a coextruded five-layer composite structure made in sheet form with a statistical ethylene-propylene copolymer (Quantum PP-7200-GF), adhesive and EVOH (EVAL® F-101) (PP/adhesive/EVOH/adhesive/PP). All formulations were compounded using a single screw extruder.

Each formulation contained about 90 wt. % base resin as identified in Table 1 and about 10 wt. % grafted product having about 2.0 to about 2.5 wt. % maleic anhydride grafted onto a propylene/ethylene impact copolymer (approximately 12 wt. % ethylene; ungrafted MFR of 0.7 g/10 min). The base resin compositions of the five samples and the adhesion to polypropylene and EVOH are shown in Table 1 below.

Samples A and B were adhesives according to the invention, each having a modified impact base resin that was made by blending a mixture of approximately 90 wt. % impact copolymer and 10 wt. % HDPE to an MFR of about 2 and about 5 g/10 min., respectively. The ethylene content of each of the modified impact copolymers was about 20 wt. %.

Sample C was a comparative blend having an impact copolymer base resin (Quantum PP-1510) which contained 12 wt. % ethylene and had a melt flow rate of 0.7 g/10 min.

Sample D was a comparative blend having a statistical ethylene-propylene copolymer base resin.

Sample E was a comparative commercially available adhesive having a thermoplastic polyolefin (TPO) base resin containing about 41 wt. % ethylene/propylene rubber.

TABLE 1

| | ADHESION VALUES FOR COMPOSITIONS WITH 90 WT. % PP BASE RESINS AND 10 WT. % GRAFTED PRODUCT | | | |
|---|---|---|---|---|
| Sample | Type of Base Resin | MFR[1] | Ethylene Content (Wt. %) | Adhesion (lb/in.) |
| A | Modified Impact | 2.0 | 20 | 19.0 |
| B | Modified Impact | 5.0 | 20 | 23.0 |
| C | Impact | 0.7 | 12 | 14.0 |
| D | Statistical | 2.0 | 2 | 2.5 |
| E | TPO | — | — | 14.0 |

[1]Melt flow rate in g/10 min. at 230° C., 2160 grams.

A comparison of the adhesion values obtained in Samples A and B verses C, D, and E demonstrates the excellent adhesion was obtained when the base resin was a modified impact copolymer.

Example 2

Four adhesives were made (Samples F through I) of various formulations of a graft copolymer and polypropylene base resin. A third component was added to the blends of Samples G, H and I. The formulations of these samples and their physical properties including MFR and Vicat Softening point values are set forth in Table 2.

Sample F was an adhesive according to the invention comprising a modified impact base resin and the grafted product described in Example 1.

Sample G was a comparative adhesive that included a third component, a high molecular weight low density polyethylene (HMW LDPE) having a melt index of about 0.3 g/10 min.

Sample H was a comparative adhesive that included a third component, a linear low density polyethylene (LLDPE) having a melt index of about 1.0 g/10 min.

Sample I was a control sample which did not contain a modified impact copolymer. The base resin of Sample I was a commercially available statistical ethylene-propylene copolymer comprising about 2 wt. % ethylene and having an MFR of about 2 g/10 min. Sample I also contained an ethylene/propylene rubber as a third component.

TABLE 2

| | COMPOSITIONS AND PHYSICAL PROPERTIES OF ADHESIVE BLENDS | | | | | | | |
|---|---|---|---|---|---|---|---|---|
| | Base Resin | | Grafted | Third Component | | | | |
| Sample | Statistical | Modified Impact | Polymeric Product | GA 501-010 | PE 3509 | V-746-1 (EPR) | MFR[1] | Vicat Softening Point[2] |
| F | | 94 | 6 | | | | 3.3 | 125 |
| G | | 74 | 8 | | 18 | | 2.8 | 116 |
| H | | 74 | 8 | 18 | | | 3.2 | 116 |
| I | 60 | | 10 | | | 30 | 2.9 | 108 |

[1]In g/10 min. at 230° C.
[2]In °C. measured by ASTM 1525.

Each sample was evaluated for sheet extrusion and blowmolding. For the sheet extrusion, each sample was used to adhere two layers of a propylene homopolymer film having an MFR of 5 g/10 min. and a density of 0.915 g/cc to an ethylene/vinyl alcohol copolymer (EVOH) (EVAL® E-151) film sandwiched therebetween. The propylene homopolymer layers were approximately 18 mils. thick. The EVOH layer was approximately 4.5 mils. thick and the adhesive layers ranged between about 2.2 and about 2.3 mils. in thickness.

In the sheet extrusion process, each resin required a separate extruder. From the extruder, the resin was fed into a feedblock where the materials were combined into a multi-layer structure. As a sheet exited the die it was cooled by a series of chilled rolls. The process parameters for the sheet extrusion are set forth in Table 3.

For the bottles, the samples (approximately 1.5 mils. in thickness) were used to adhere a statistical ethylene-propylene copolymer (approximately 24.5 mils. thick) to an ethylene/vinyl alcohol (EVAL® F-101) film (approximately 4.0 mils thick).

In the coextrusion blowmolding process, material from separate extruders were combined in a specially designed die. A parison was formed, inflated and then cooled to form a multilayer bottle. The blowmolding process parameters are set forth in Table 4.

Adhesion of the sheets and bottles was measured using a 90° T-peel test.

TABLE 3

| SHEET EXTRUSION PROCESS PARAMETERS | |
|---|---|
| Material | Melt Temp. °F. |
| Propylene Homopolymer | 435 |
| Adhesive | 435 |
| EVAL ® E-151 | 425 |
| Die Temperature - 440/430/440° F. | |
| Chill Roll Temp. 185/190/195° F. | |
| Line Speed - 5.2 ft./min. | |

TABLE 4

| BLOWMOLDING PROCESS PARAMETERS | |
|---|---|
| Material | Extruder Temp. Setting °F. |
| Statistical Copolymer | 410 |
| Adhesive | 410 |
| EVAL F-101 | 405 |
| Cycle Time - 15 seconds | |

TABLE 5

| ADHESION VALUES (lb/in) | | |
|---|---|---|
| Sample | Sheet | Bottles |
| F | 15.4 | 10.3 |
| G | 9.7 | 7.7 |
| H | 11.6 | 9.5 |
| I | 10.9 | 6.0 |

A comparison of the adhesion values obtained in Sample F verses Samples G and H demonstrates that excellent adhesion was obtained in both sheet extrusion and bottle applications with the two component blend of the invention.

With respect to Sample I, wherein the modified impact copolymer of the inventive blend was replaced with a statistical copolymer base resin and a third component (EPR rubber) was also added to the blend, the results of Table 5 show that Sample F, the adhesive blend according to the invention, exhibited superior adherence in sheet extrusion and bottle applications. It is further noted that the Vicat Softening Point of the blend of Sample I (see Table 2) is lower than the Vicat Softening Point of Sample F, which might be considered undesirable in certain applications as discussed earlier in the application.

Example 3

Five adhesive blends were made (Samples J through N) and their adhesion values were measured using a T-peel test according to ASTMD 1876 on a coextruded five-layer composite structure made in sheet form with a statistical ethylene-propylene copolymer (Quantum PP-7200-GF of 10 mil. thickness), adhesive (2.5 mil. thickness) and EVOH (EVAL ® F-101 of 3 mil. thickness) with the structure: PP/Adhesive/EVOH/Adhesive/PP. All formulations were compounded using a single screw extruder.

Each formulation contained about 90 wt. % base resin and about 10 wt. % grafted product having approximately 1.0 wt. % maleic anhydride grafted onto a polypropylene homopolymer. The base resin compositions of the five samples and the adhesion to polypropylene and EVOH are shown in Table 6 below.

Samples J and K were adhesives according to the invention, each having a modified impact base resin that was made by blending a mixture of approximately 90 wt. % impact copolymer and 10 wt. % HDPE to an MFR of about 2 and about 5 g/10 min., respectively. The ethylene content of each of the modified impact copolymers was about 22 wt. %.

Sample L was a comparative blend having a polypropylene homopolymer base resin with a melt flow rate of 5.0 g/10 min.

Sample M was a comparative blend having a statistical ethylene-propylene copolymer base resin with an ethylene content of about 2 wt. % and a melt flow rate of 2.0 g/10 min.

Sample N was a comparative blend having an impact base resin with an ethylene content of about 10 wt. % and an melt flow rate of 2.5 g/10 min.

TABLE 6

| ADHESION VALUES FOR COMPOSITIONS WITH 90 WT. % PP BASE RESINS AND 10 WT. % GRAFTED PRODUCT | | | | |
|---|---|---|---|---|
| Sample | Type of Base Resin | Base Resin MFR[1] | Base Resin Ethylene Content (Wt. %) | Adhesion (lb/in) |
| J | Modified Impact | 2.0 | 22 | 8.0 |
| K | Modified Impact | 5.0 | 22 | 6.8 |
| L | Homopolymer | 5.0 | 0 | 1.7 |
| M | Statistical | 2.0 | 2 | 2.4 |
| N | Impact | 2.5 | 10 | 4.4 |

[1]Melt flow rate in g/10 min. at 230° C., 2160 grams.

A comparison of the adhesion values obtained in Samples J and K verses L, M and N demonstrates that excellent adhesion was obtained when a modified impact copolymer base resin is blended with a maleic anhydride grafted polypropylene homopolymer. The foregoing detailed description is given for clearness of understanding only, and no unnecessary limitations are to be understood therefrom, as modifications within the scope of the invention will be obvious to those skilled in the art.

I claim:

1. An adhesive blend consisting essentially of a mixture of a modified impact copolymer and a grafted polymeric product comprising an impact propylene-ethylene copolymer grafted with an ethylenically unsaturated carboxylic acid or derivative grafting monomer, said modified impact copolymer comprising a blend selected from the group consisting of:
  (I) a blend of (A) an impact copolymer selected from the group consisting of (a) reactor-made intimate mixtures of propylene homopolymers and statistically oriented copolymers of propylene and ethylene, and (b) blends of propylene homopolymers and statistically oriented copolymers of propylene and ethylene and (B) high density polyethylene (HDPE); and,
  (II) a visbroken blend of (A) an impact copolymer selected from the group consisting of (a) reactor-made intimate mixtures of propylene homopolymers and statistically oriented copolymers of propylene and ethylene, and (b) blends of propylene homopolymers and statistically oriented copolymers of propylene and ethylene and (B) high density polyethylene (HDPE);
  said modified impact copolymer having an MFR of between about 1 and about 200 g/10 min. measured at a condition test temperature of 230° C.

2. The adhesive blend of claim 1 wherein said modified impact copolymer is (I).

3. The adhesive blend of claim 2 wherein said HDPE comprises between about 5 and about 30 wt. % of said modified impact copolymer.

4. The adhesive blend of claim 2 wherein said HDPE has a melt index of about 2 to about 50 g/10 min. measured at a condition test temperature of 190° C.

5. The adhesive blend of claim 1 wherein said modified impact copolymer is (II) and the MFR of said modified impact copolymer is in the range of about 1 to about 50 g/10 min. measured at a condition test temperature of 230° C.

6. The adhesive blend of claim 5 wherein said modified impact copolymer comprises an ethylene content of between about 15 and about 30 wt. %.

7. An adhesive blend consisting essentially of a mixture of a modified impact copolymer and a grafted polymeric product comprising a polymeric composition containing a propylene polymer grafted with an ethylenically unsaturated carboxylic acid or derivative grafting monomer;
  said propylene polymer comprising an impact ethylene-propylene copolymer; and,
  said modified impact copolymer comprising a blend of (A) an impact copolymer selected from the group consisting of (a) reactor-made intimate mixtures of propylene homopolymers and statistically oriented copolymers of propylene and ethylene, and (b) blends of propylene homopolymers and statistically oriented copolymers of propylene and ethylene and (B) high density polyethylene(HDPE), said modified impact copolymer having an MFR of between about 1 and about 200 g/10 min. measured at a condition test temperature of 230° C.

8. The adhesive blend of claim 7 wherein said modified impact copolymer comprises between about 70 and about 97 wt. % of said adhesive blend.

9. The adhesive blend of claim 7 wherein said modified impact copolymer has an MFR of between about 1 and about 10 g/10 min. measured at a condition test temperature of 230° C.

10. The adhesive blend of claim 7 wherein said impact copolymer of said grafted polymeric product and/or (A) comprises between about 5 and about 30 wt. % ethylene.

11. The adhesive blend of claim 7 wherein said modified impact copolymer comprises between about 85 and about 95 wt. % of the impact copolymer of (A) and between about 5 and about 15 wt. % of the high density polyethylene of (B).

12. The adhesive blend of claim 7 wherein said grafting monomer comprises between about 0.1 and about 6.0 wt. % of said grafted polymeric product.

13. The adhesive blend of claim 7 wherein said grafting monomer is selected from the group consisting of acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthalic anhydride, and x-methylbicyclo(2.2.1)hept-5-ene-2,3-dicarboxylic acid anhydride (XMNA).

14. The adhesive blend of claim 7 wherein said grafting monomer comprises at least about 1.0 wt. % of said grafted polymeric product and said grafted polymeric product has an MFR of about 700 g/10 min. or less measured at a condition test temperature of 230° C., and greater than that of said polymeric composition prior to grafting as measured at a condition test temperature of 230° C.

15. The adhesive blend of claim 14 wherein said grafting monomer is maleic anhydride.

16. The adhesive blend of claim 15 wherein said grafting monomer comprises about 1 to about 6 wt. % of said grafted polymeric product and the MFR of said grafted polymeric product is about 300 to about 500 g/10 min. measured at a condition test temperature of 230° C.

* * * * *